Feb. 8, 1966  C. H. BECKER  3,233,930
PIVOTAL JOINT CONNECTING FASTENER
Filed June 26, 1963
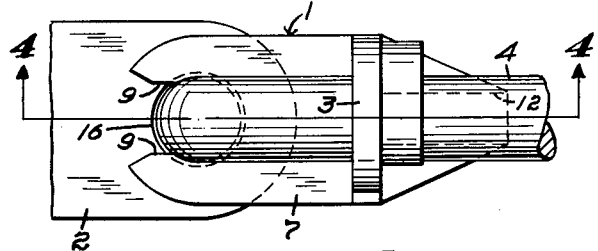
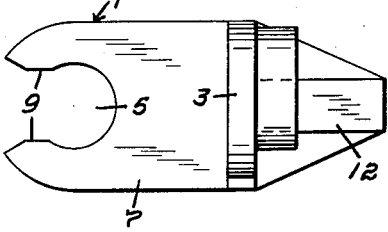
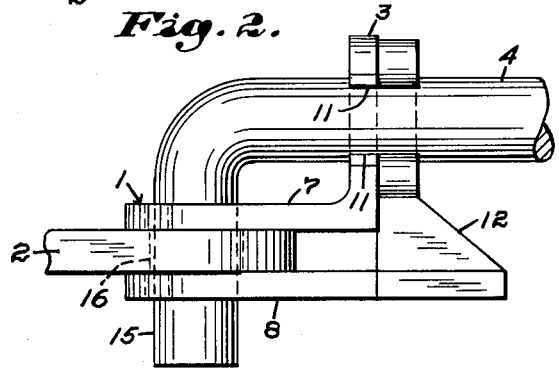
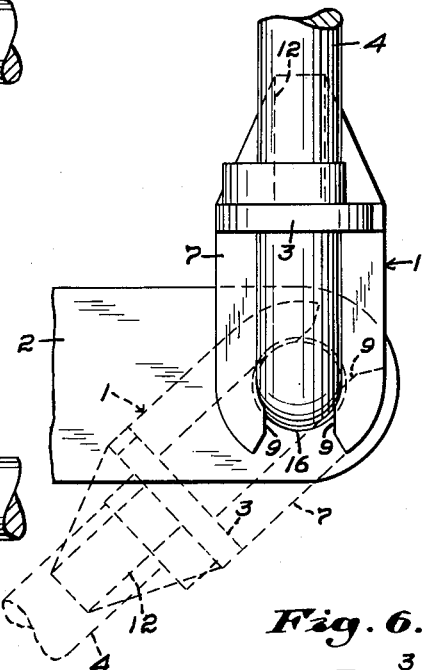
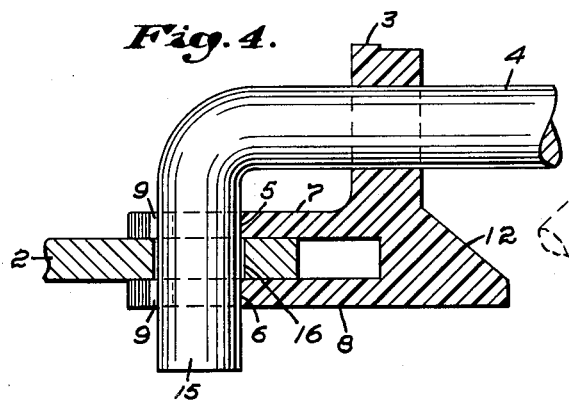
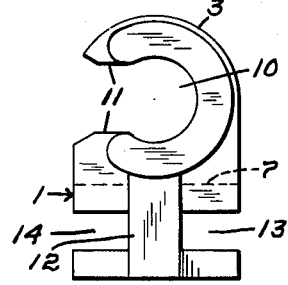
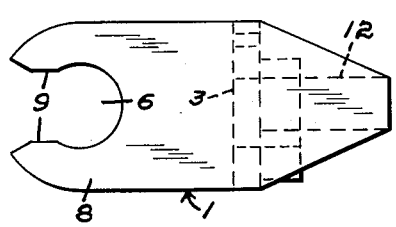
Inventor:
Charles H. Becker,
by Walter S. Jones
Atty.

United States Patent Office 3,233,930
Patented Feb. 8, 1966

3,233,930
PIVOTAL JOINT CONNECTING FASTENER
Charles H. Becker, Braintree, Mass., assignor to United-Carr Incorporated, a corporation of Delaware
Filed June 26, 1963, Ser. No. 290,804
1 Claim. (Cl. 287—93)

This invention is directed to an improved fastener for connecting two associated members thereby to provide a pivotal joint between the two members. Fasteners of this nature have been called rod end clips in the trade and are used in many instances to connect a bent rod to a lever.

A prior patent in this art is United States patent to Andre J. E. Roualet, No. 1,966,599 issued July 17, 1934.

An object of the invention is to provide a simple fastener particularly for holding, in assembly, a pair of pivotally related members; the fastener having a fork-like portion adapted to span one of the members and snap into engagement with the other member and having another portion at an angle to the fork-like portion also adapted to snap into engagement with the other member whereby the fastener may be used in connection with difficult to assemble members in pivotal relation and at the same time provide for a wide variation of angular relationship between the two members.

Another object of the invention is to provide a simple, yieldable, molded plastic fastener of minimum size and of a strong, durable construction having snap fastening portions adjacent apertures whereby the fastener may be easily and quickly assembled and disassembled with relation to two members that are intended to be pivotally connected.

Another object of the invention is to provide a joint connecting fastener formed from a single piece of synthetic, injection molded yieldable plastic material, such as nylon, for joining, in pivotal relationship, two members in such a manner that they may be rotated relative to each other substantially more than 180°.

With reference to the drawings which illustrate one embodiment of the invention:

FIG. 1 is a plan view of a fastener of the invention in association with a portion of a lever and a portion of a bent rod;

FIG. 2 is a side elevation of the installation shown in FIG. 1;

FIG. 3 is a plan view of the installation shown in FIG. 1 with the rod and lever at right angles and dotted view of the fastener and rod in another angular position to the lever;

FIG. 4 is a section taken on the line 4—4 of FIG. 1;

FIG. 5 is a plan view of the fastener per se;

FIG. 6 is a rear end view of the fastener shown in FIG. 5; and

FIG. 7 is a bottom plan view of the fastener shown in FIG. 5.

The illustrated fastener is of a construction in compact form of yieldable, molded plastic material and having a fork-like portion 1 to engage a lever 2 (or other suitable apertured part) and another portion 3 extending at an angle to the fork-like portion 1 for engagement with a bent rod member 4 and having novel features associated therewith as will be described, and which are improvements over the device covered by the patent to Roualet, No. 1,966,599 referred to above.

While the fastener member of the invention may be formed of any suitable yieldable material the one illustrated is formed of yieldable synthetic, plastic material molded in a single piece. In the construction illustrated the fork-like portion 1 has aligned apertures in the form of slots 5 and 6 in the arms 7 and 8 of the fork-like portion 1 and each of the arms 7 and 8 has portions 9 extending toward each other to narrow the slots 5 and 6 thereby to provide snap fastening means, purposes of which will be described hereafter.

The other portion 3 of the fastener member is also provided with an aperture 10 in the form of a slot and here again there are oppositely extending portions 11—11 facing each other to reduce the slot 10 to provide strength to the device at the junction. Between the fork-like portion 1 and the other portion 3 there is molded a tail portion 12 which tapers toward its free end and also from the free end toward the other portion 3 as clearly illustrated by the drawings. This tail portion 12 is of less width than the fork-like portion 1 thereby to provide openings 13 and 14 (FIG. 6) adjacent where the tail portion 12 connects with the fork-like portion 1.

An assembly, to provide a pivotal joint between the lever member and the bent rod, is clearly shown in FIGS. 1, 2, and 4 wherein the fastener is clearly illustrated as holding the pivotal parts.

Heretofore, rod end fasteners or clips of metal have been widely used in joining similar members but it has been necessary to slide the opposing fingers of the fastener over the lever and then insert the bent end of the rod through the aligned apertures of the fingers and the lever. Thereafter a swinging action would engage the spring clip portion of the fastener with the rod.

In the present construction it is possible to engage the fastener with the rod 4 by snapping the rod between the restricted portions 11—11 into the aperture or slot 10 in the portion 3 then insert the bent end 15 of the rod 4 into the aperture 16 in the lever 2. Thereafter, the fastener may be slid along the rod 4 toward the bent end 15 and the lever 2 so that the lever will enter between the arms 7 and 8 and snap by the portions 9—9 into the recesses 5 and 6 of the fork-like portion 1. Thus a snap action takes place between the fork-like portion 1 and the bent end 15 of the rod so that the assembly of the parts is complete. Thereafter, the rod and fastener may be moved relative to the lever in various positions over a distance of more than 180° as will be obvious from a study of FIG. 3. By providing the notches 14—14 which may receive the lever 2 it will be obvious that the number of degrees of relative rotation will be increased over the number of degrees possible if such notches were not provided.

While both of the fingers 7 and 8 of the fork-like portion 1 are provided with projections 9—9 it will be obvious, to anyone skilled in the art, that these portions 9—9 could be eliminated from one of the arms depending upon the holding power of the material of the arms when snapped into engagement with the rod 4.

While there has been illustrated and described one operable construction of the invention it should be understood that variation in shape and arrangement of the elements of the fastener may be made without departing from the scope of the invention which is best defined by the following claim.

I claim:

A one piece fastener comprising first and second leg members, said leg members being rigidly joined together and disposed in planes substantially at right angles, the first leg member including an upper portion and a lower portion disposed in parallel spaced relation to the upper portion, said portions being integrally joined in cantilever fashion at a point adjacent said second leg, each portion having its free end bifurcated, with the outer ends of the furcations having their opposed faces enlarged to partially reduce the size of the slot formed by said furcations, said second leg having a slot formed therein opening through one side of said second leg, the opposed walls of said slot having enlargements thereon to thereby reduce the size of the throat of the slot with the remainder thereof.

References Cited by the Examiner
UNITED STATES PATENTS

| | | | |
|---|---|---|---|
| 1,519,046 | 12/1924 | Pewther | 287—100 |
| 1,966,599 | 7/1934 | Roualet | 287—93 |
| 2,204,117 | 6/1940 | Brammer. | |
| 2,470,811 | 5/1949 | Engleman | 24—81 |
| 2,925,295 | 2/1960 | Boehlow | 287—93 |
| 2,963,761 | 12/1960 | Haydock | 24—257 |
| 3,061,340 | 10/1962 | Fernberg et al. | 24—257 |

CARL W. TOMLIN, *Primary Examiner.*